United States Patent
Horn

(10) Patent No.: US 9,516,553 B2
(45) Date of Patent: Dec. 6, 2016

(54) HANDOVER CONTROL BASED ON CLOSED SUBSCRIBER GROUP SUBSCRIPTION INFORMATION

(75) Inventor: Gavin B. Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 12/642,292

(22) Filed: Dec. 18, 2009

(65) Prior Publication Data

US 2010/0157944 A1 Jun. 24, 2010

Related U.S. Application Data

(60) Provisional application No. 61/140,584, filed on Dec. 23, 2008.

(51) Int. Cl.
| | |
|---|---|
| H04W 36/00 | (2009.01) |
| H04W 4/08 | (2009.01) |
| H04W 36/04 | (2009.01) |
| H04W 84/04 | (2009.01) |

(52) U.S. Cl.
CPC .......... *H04W 36/0005* (2013.01); *H04W 4/08* (2013.01); *H04W 36/04* (2013.01); *H04W 84/045* (2013.01)

(58) Field of Classification Search
CPC .. H04W 36/0005; H04W 4/08; H04W 84/045; H04W 36/04
USPC .......................... 370/331, 338; 455/434, 436
See application file for complete search history.

(56) References Cited

U.S. PATENT DOCUMENTS

| | | | |
|---|---|---|---|
| 5,946,632 A | 8/1999 | Yi et al. | |
| 2002/0106995 A1 | 8/2002 | Callaway et al. | |
| 2004/0196813 A1 | 10/2004 | Ofek et al. | |
| 2007/0086388 A1* | 4/2007 | Kang et al. | 370/331 |
| 2008/0267153 A1* | 10/2008 | Mukherjee et al. | 370/338 |
| 2009/0047960 A1* | 2/2009 | Gunnarsson et al. | 455/436 |
| 2009/0092097 A1* | 4/2009 | Nylander et al. | 370/331 |
| 2009/0270092 A1* | 10/2009 | Buckley et al. | 455/434 |
| 2010/0157943 A1 | 6/2010 | Horn | |
| 2010/0267388 A1* | 10/2010 | Olsson | 455/436 |
| 2011/0165878 A1* | 7/2011 | Nylander et al. | 455/436 |

FOREIGN PATENT DOCUMENTS

| | | |
|---|---|---|
| CN | 1809214 A | 7/2006 |
| EP | 2079250 A1 | 7/2009 |
| JP | 2009124671 A | 6/2009 |

(Continued)

OTHER PUBLICATIONS

3GPP: "TS 36.423 V8.2.0; Technical Specification Group Radio Access Network; Evolved Universal Terrestrial Radio Access Network (EUTRAN); X2 Application Protocol (X2AP)," Jun. 2008.

(Continued)

*Primary Examiner* — Kan Yuen
*Assistant Examiner* — Richard Chang
(74) *Attorney, Agent, or Firm* — François A. Pelaez

(57) ABSTRACT

One or more nodes in a network provide access control for an in-bound handover of an access terminal to a closed subscriber group. For example, at least one of a source access point, a network node, or a target access point may determine whether handover is allowed based on whether a closed subscriber group identifier of the target access point is listed in closed subscriber group subscription information for the access terminal.

18 Claims, 13 Drawing Sheets

(56) References Cited

FOREIGN PATENT DOCUMENTS

| JP | 2010537480 A | 12/2010 |
|----|--------------|---------|
| KR | 20010002673 A | 1/2001 |
| WO | 2008134281 A2 | 11/2008 |
| WO | WO2009022976 A1 | 2/2009 |

OTHER PUBLICATIONS

Alcatel-Lucent: "Handover Restriction List update" 3GPP Draft; R3-083032, 3rd Generation Partnership Project (3GPP), Mobile Competence Centre ; 650, Route Des Lucioles ; F-06921 Sophia-Antipolis Cedex ; France, No. Prague, Czech Republic; Nov. 5, 2008, Nov. 5, 2008 (Nov. 5, 2008), XP050324274 [retrieved on Nov. 5, 2008].

Ericsson: "CSG id in Initial UE message" 3GPP Draft; R3-083322, 3rd Generation Partnership Project (3GPP), Mobile Competence Centre ; 650, Route Des Lucioles ; F-06921 Sophia-Antipolis Cedex ; France, No. Prague, Czech Republic; Nov. 5, 2008, Nov. 5, 2008.

Ericsson: "Handover Restriction List Signaling," 3GPP Draft; R3-081372, 3rd Generation Partnership Project (3GPP), Mobile Competence Centre, Apr. 30, 2008.

International Search Report and Written Opinion—PCT/US2009/069339, International Search Authority—European Patent Office—Aug. 10, 2010.

International Search Report and Written Opinion—PCT/US2009/069341, International Search Authority—European Patent Office—Sep. 1, 2010.

J. Carstens: "Architecture alternatives for LTE Femto GW Integration into Evolved Packet Core" Aug. 12, 2008 (Aug. 12, 2008), XP002588392 Retrieved from the Internet: URL: http://priorartdatabase.com/IPCOM/0001 73330 [retrieved on Jun. 23, 2010] the whole document.

Mitsubishi Electric: "Home eNodeBs and Access Policy Enforcement," 3GPP TSG RAN WG3 57, R3-071588, Aug. 27, 2007.

Nokia Siemens Networks, et al.: "Impact on S1AP from HeNB GW Concept," 3GPP Draft, R3-080465, 3rd Generation Partnership Project, Competence Centre, Feb. 18, 2008.

Panasonic: "CSG cell handover" 3GPP Draft; R2-080884_CSG Cell Handover, 3rd Generation Partnership Project (3GPP), Mobile Competence Centre ; 650, Route Des Lucioles ; F-06921 Sophia-Antipolis Cedex ; France, vol. RAN W62, No. Sorrento, Italy; Feb. 11, 2008, Feb. 5, 2008.(Feb. 5, 2008), XP050138693 the whole document.

Panasonic: "UE Access Control in CSG Cell," 3GPP Draft; R2-082238_UE Access Control in CSG Cell, 3rd Generation Partnership Project (3GPP), Mobile Competence Centre; May 5-9, 2008.

Qualcomm Europe: "Principles of Access Control for CSG Cells" 3GPP Draft; CI_083100, 3rd Generation Partnership Project (3GPP), Mobile Competence Centre ; 650, Route Des Lucioles ; F-06921 Sophia-Antipolis Cedex ; France, No. Budapest, Hungary; Aug. 11, 2008.

Vodafone Group: "Handover to CSG Cells," 3GPP Draft; R2-072827, 3rd Generation Partnership Project (3GPP), Mobile Competence Centre, Jul. 2, 2007.

Taiwan Search Report—TW098144553—TIPO—Sep. 5, 2012.

Huawei: "Adding 1 bit Indicator into the ECGI", 3GPP Draft, R3-082526, Sep. 24, 2008, XP050323812, 2 pages.

Nokia Siemens Networks: "Clean up and Update on Security, Mobility and DRX", 3GPP Draft, R2-074673, Nov. 12, 2007, XP050137200, pp. 1-106.

\* cited by examiner

HANDOVER CONTROL BASED ON CLOSED SUBSCRIBER GROUP SUBSCRIPTION INFORMATION

CLAIM OF PRIORITY

This application claims the benefit of and priority to commonly owned U.S. Provisional Patent Application No. 61/140,584, filed Dec. 23, 2008, the disclosure of which is hereby incorporated by reference herein.

CROSS-REFERENCE TO RELATED APPLICATION

This application is related to concurrently filed and commonly owned U.S. patent application Ser. No. 12/642,277, entitled "ACCESS POINT HANDOVER CONTROL BASED ON CLOSED SUBSCRIBER GROUP SUBSCRIPTION INFORMATION," the disclosure of which is hereby incorporated by reference herein.

BACKGROUND

Field

This application relates generally to wireless communication and more specifically, but not exclusively, to handover control.

Introduction

A wireless communication network is deployed over a defined geographical area to provide various types of services (e.g., voice, data, multimedia services, etc.) to users within that geographical area. In a typical implementation, access points (e.g., corresponding to different cells or sectors) are distributed throughout a network to provide wireless connectivity for access terminals (e.g., cell phones) that are operating within the geographical area served by the network. In general, at a given point in time, the access terminal will be served by a given one of these access points. As the access terminal roams throughout this geographical area, the access terminal may move away from its serving access point and move closer to another access point. In addition, signal conditions within a given cell may change, whereby an access terminal may be better served by another access point. In these cases, the access terminal may be handed-over from its serving access point to be served by the other access point to maintain mobility for the access terminal.

An example of how the serving access point for an access terminal may be changed follows. The access terminal may regularly perform radio frequency ("RF") measurements and determine that the signals being received from a neighbor access point (e.g., a so-called target access point) are stronger than the signals being received from the current serving access point by a certain margin. As a result, the access terminal sends a measurement report with this information to the network (e.g., to the serving access point). The serving access point then performs backhaul communication with the target access point to negotiate resources for the access terminal on the target access point. In addition, the serving access point sends a handover command to the access terminal, wherein the handover command identifies the resources assigned to the access terminal on the target access point. Finally, the access terminal connects to the target access point using these resources.

In some networks, access points may be deployed whereby only specified subscribers are allowed to access a given set of one or more access points. For example, a closed subscriber group (CSG) may be defined such that only users that are subscribed with that CSG are allowed to access an access point that is a member of the CSG. All other users in the network may then be rejected if they attempt to access an access point that is a member of the CSG (an exception may be made for emergency calls). Accordingly, there is a need for effective mechanisms to control access to such access points during handover.

SUMMARY

A summary of sample aspects of the disclosure follows. In the discussion herein, any reference to the term aspects may refer to one or more aspects of the disclosure.

The disclosure relates in some aspects to controlling handover of an access terminal. For example, one or more nodes in a network may provide access control for in-bound handovers to a CSG.

In some cases, a source access point (e.g., a cell of the source access point) provides access control for in-bound handover of an access terminal to a target access point (e.g., a cell of the target access point) associated with a CSG. In some aspects, the source access point controls access based on whether a CSG identifier (CSG ID) of the target access point is listed in the CSG subscription information for the access terminal.

In some cases, a network node (e.g., a mobility manager) provides access control for in-bound handover to a target access point associated with a CSG. In some aspects, the network node controls access based on whether the CSG ID of the target access point is in the CSG subscription information for the access terminal. In addition, the network node may provide the CSG subscription information to other nodes in the system (e.g., source access points).

In some cases, a target access point associated with a CSG provides access control for in-bound handover to itself. In some aspects, the target access point controls access based on whether the CSG ID of the target access point is in the CSG subscription information for the access terminal.

BRIEF DESCRIPTION OF THE DRAWINGS

These and other sample aspects of the disclosure will be described in the detailed description and the appended claims that follow, and in the accompanying drawings, wherein:

Figure 1:
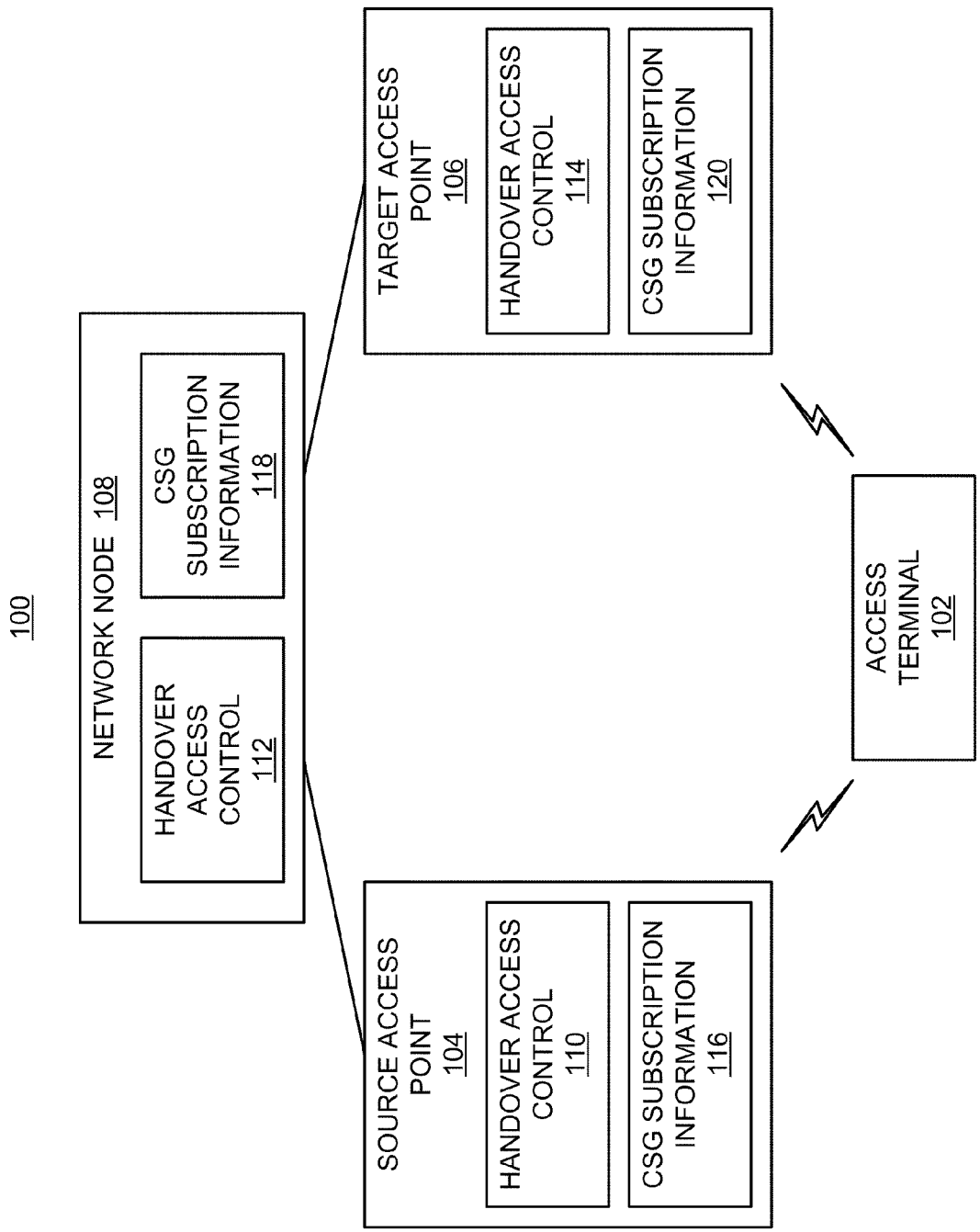
FIG. 1 is a simplified block diagram of several sample aspects of a communication system adapted to control handover of an access terminal.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations, NodeBs, home NodeBs, Radio Network Controllers (RNCs), eNodeBs, or home eNodeBs, while access terminals may be referred to or implemented as user equipment or mobiles.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104 or an access point 106. Each of the access points 104 and 106 may communicate with one or more network nodes (represented, for convenience, by network node 108) to facilitate wide area network connectivity. These network nodes may take various forms such as, for example, one or more radio and/or core network entities. Thus, in various implementations the network node 108 may represent functionality such as at least one of: network management (e.g., via an operation, administration, management, and provisioning entity), call control, session management, mobility management, gateway functions, interworking functions, or some other suitable network functionality.

One or more of the access point 104, the network node 108, and the access point 106 may provide access control for handover of the access terminal 102 from the access point 104 to the access point 106. In some cases, an access terminal may be handed-over to an access point associated with a wireless cell set. In general, a wireless cell set comprises a set of one or more cells (e.g., at least one access point) where there is a defined relationship specific to that set. An example of a wireless cell set is a CSG. For convenience, the discussion that follows may simply refer to the term CSG, rather than the more general term wireless cell set. It should be appreciated, however, that the described concepts may be applicable to other types of defined sets or groups of wireless cells or other similar entities.

In some aspects, the access point 104, the network node 108, and the access point 106 may provide access control by determining whether a CSG ID associated with the access point 106 is listed in the CSG subscription information for the access terminal 102. If so, handover will be allowed since the access terminal 102 has been subscribed to access the CSG associated with the access point 106. Otherwise, the handover will not be allowed.

For illustration purposes, each of these nodes is illustrated as including handover access control components (i.e., handover access control functionality 110, 112, and 114 and access terminal CSG subscription information 116, 118, and 120). In practice, however, one or more of these nodes may not include such functionality. For example, in some implementations, only the network node 108 and/or the target access point 106 provide handover access control as taught herein.

Sample operations of the system 100 will now be described in more detail in conjunction with the flowcharts of FIGS. 2-4. For convenience, the operations of FIGS. 2-4 (or any other operations discussed or taught herein) may be described as being performed by specific components (e.g., the components shown in FIGS. 1 and 7). It should be appreciated, however, that these operations may be performed by other types of components and may be performed using a different number of components. It also should be appreciated that one or more of the operations described herein may not be employed in a given implementation.

Figure 2:
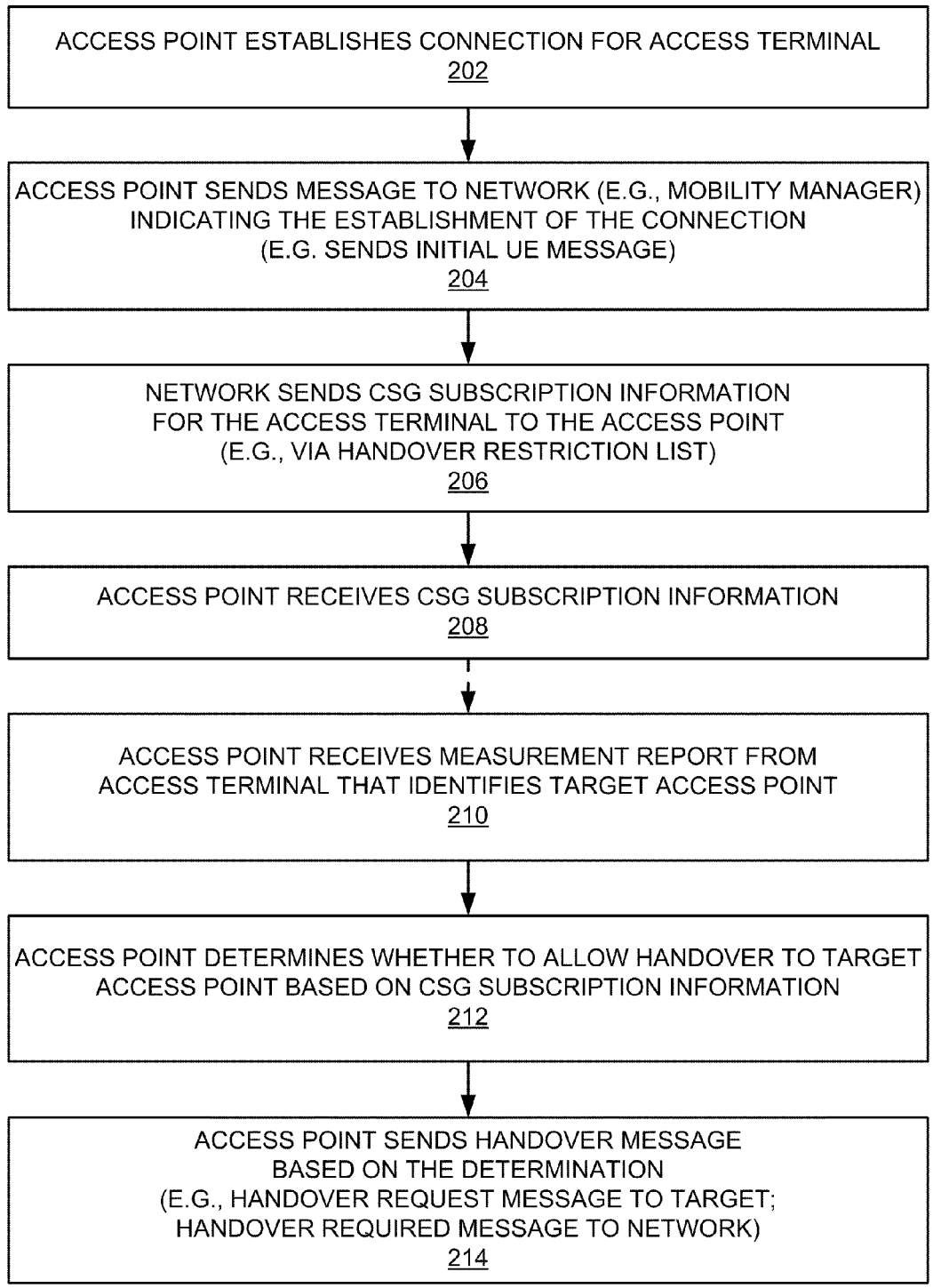
FIG. 2 is a flowchart of several sample aspects of operations that may be performed to control handover at a source access point.

FIG. 2 describes sample operations that may be performed in conjunction with a source access point controlling whether an access terminal being served by that access point will be handed-over to a target access point. Blocks 202-208 describe sample operations relating to configuring the source access point with CSG subscription information for the access terminal Blocks 210-214 describe sample operations relating to handover access control based on the CSG subscription information.

As represented by block 202, at some point in time a connection is established for an access terminal (e.g., access terminal 102) at an access point (e.g., access point 104). For example, the access terminal may be powered on when it is located within a cell of the access point, the access terminal may establish a connection from idle mode, or the access terminal may be handed-over to the access point from another access point.

As represented by block 204, the access point then sends a message to the network to inform the network that the access terminal has established a connection at the access point. For example, the access point may send an "initial UE message" to a mobility manager such as a mobility management entity (MME) or a serving GPRS support node (SGSN).

As represented by block 206, in response to this message, the network sends CSG subscription information for the access terminal to the access point. For example, the mobility manager may send an initial context setup request message to the access point that includes the CSG subscription information. In some implementations, this CSG subscription information may be included in a handover restriction list information element (IE). The access point receives the CSG subscription information as represented by block 208.

In some aspects, the CSG subscription information for a given access terminal identifies at least one CSG at which that access terminal is allowed access (e.g., the CSG subscription information includes a list of one or more CSG IDs). Thus, the CSG subscription information may be referred to as an allowed CSG list (e.g., from the perspective of the access terminal).

As discussed above, an access terminal may regularly perform RF measurements to determine the signal conditions at its current cell and its neighboring cells. Consequently, the access terminal will occasionally send measurement reports with this information to its serving access point. In addition, in cases where detected cells are associated with CSGs (e.g., the cell corresponds to a femto access point such as a home eNodeB), the access terminal may include the corresponding CSG IDs in neighbor relations messages sent to the serving access point.

Thus, as represented by block 210, at some point in time the serving access point (e.g., access point 104) will receive a measurement report that identifies a target access point for handover of the access terminal. For example, when the signals being received at the access terminal from a neighbor access point are stronger than the signals being received from the current serving access point (i.e., the source access point for the handover) by a certain margin, the neighbor access point (e.g., access point 106) may be designated as a target access point for handover of the access terminal.

As represented by block 212, the source access point may determine whether to allow the access terminal to be handed-over to the target access point based on the CSG subscription information for the access terminal. For example, the source access point may check if a CSG ID associated with the target access point (e.g., a CSG ID received during automatic neighbor relations operations) is listed in the CSG subscription information.

If the source access point determines that the handover should not be allowed, the source access point will not commence handover operations. Alternatively, if the source access point decides to allow the handover, the source access point may commence handover operations by sending a handover message to an appropriate node as represented by block 214. Here, handover may be accomplished in various ways in different implementations.

As described in more detail below in conjunction with FIG. 5, in some implementations the source access point initiates handover via a message (e.g., a handover request message) that is sent directly to the target access point (e.g., via the backhaul). For example, the source access point may send such a message via the X2 protocol (specified in 3GPP TS 36.423).

As described in more detail below in conjunction with FIG. 6, in some implementations the source access point initiates handover via a message (e.g., a handover required message) that is sent to a network node (e.g., a mobility manager). For example, the source access point may send such a message via the S1 protocol (specified in 3GPP TS 36.413).

In some implementations, the handover message sent at block 214 includes the CSG subscription information for the access terminal being handed-over. For example, the CSG subscription information may be included in a handover restriction list that is included in the handover message.

Figure 3:
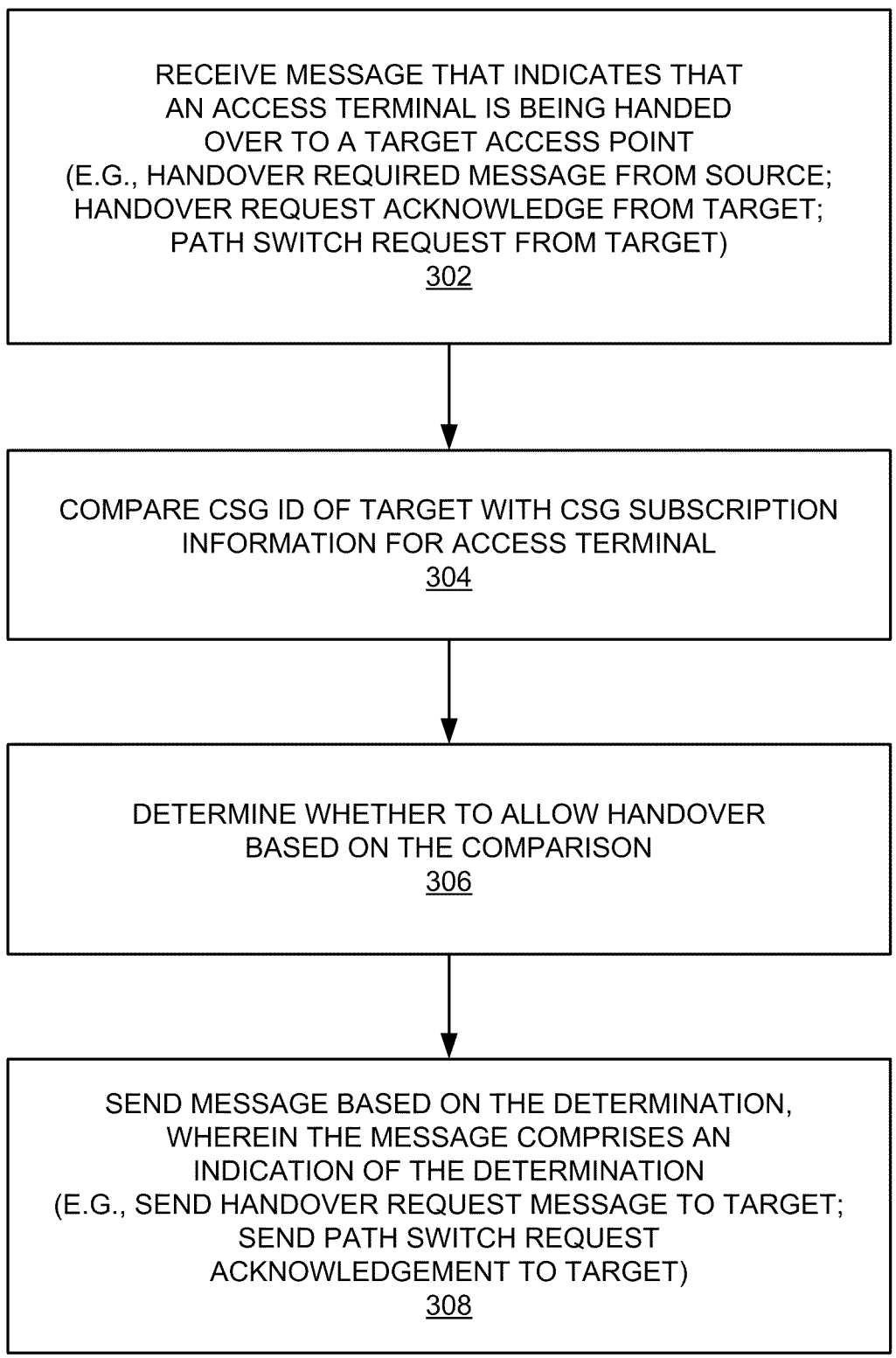
FIG. 3 is a flowchart of several sample aspects of operations that may be performed to control handover at a network node.

FIG. 3 describes sample operations that may be performed by one or more network nodes (hereinafter referred to, for convenience, as the network node) to control whether an access terminal will be handed-over to a target access point. In some implementations, the operations of FIG. 3 may be performed by a mobility manager (e.g., an MME or SGSN).

As represented by block 302, at some point in time the network node receives a message that indicates that an access terminal is being handed-over to a target access points. This message may be received from different nodes in different implementations. As described in conjunction with block 214 above and FIG. 6 below, in some implementations the network node receives a handover message (e.g., a handover required message) from the source access point. As described in more detail below in conjunction with FIG. 6, in some implementations the network node receives a handover message (e.g., a handover request acknowledge message) from the target access point. As described in more detail below in conjunction with FIG. 5, in some implementations the network node receives a handover message (e.g., a path switch request message) from the target access point.

As represented by blocks 304 and 306, the network node determines whether to allow the access terminal to be handed-over to the target access point based on the CSG subscription information for the access terminal. For example, at block 304, the network node compares a CSG ID associated with the target access point with the CSG subscription information for the access terminal to determine whether the CSG ID is listed in the CSG subscription information. Then, at block 306, the network node determines whether to allow the access terminal to be handed-over to the target access point based on the comparison.

If the network node determines that the handover should not be allowed, the network node will terminate the handover operations. For example, the network node may send a handover failure message to the node that sent the message at block 302 (e.g., send a handover preparation failure message with the appropriate error code to the source access point).

As represented by block 308, if the network node decides to allow the handover, the network node may allow the handover operations to continue by sending a handover message to an appropriate node. In some aspects, this handover message comprises an indication (e.g., explicit or implicit) of the determination of block 306.

In some aspects, the destination for this handover message may depend on the type of message received at block 302. As described in FIG. 6, in implementations where a handover required message was received from the source access point, the network node may send a handover request message to the target access point at block 308. Also as described in conjunction with FIG. 6 below, in implementations where a handover request acknowledge message was received from the target access point and the network node performs access control upon receipt of this message, the network node may send an appropriate message to the target access point at block 308 that indicates whether the handover is allowed. As described in FIG. 5, in implementations where a path switch request message was received from the target access point and the network node performs access control upon receipt of this message, the network node may send a path switch request acknowledgement message to the target access point at block 308 that indicates whether the handover is allowed.

Figure 4:
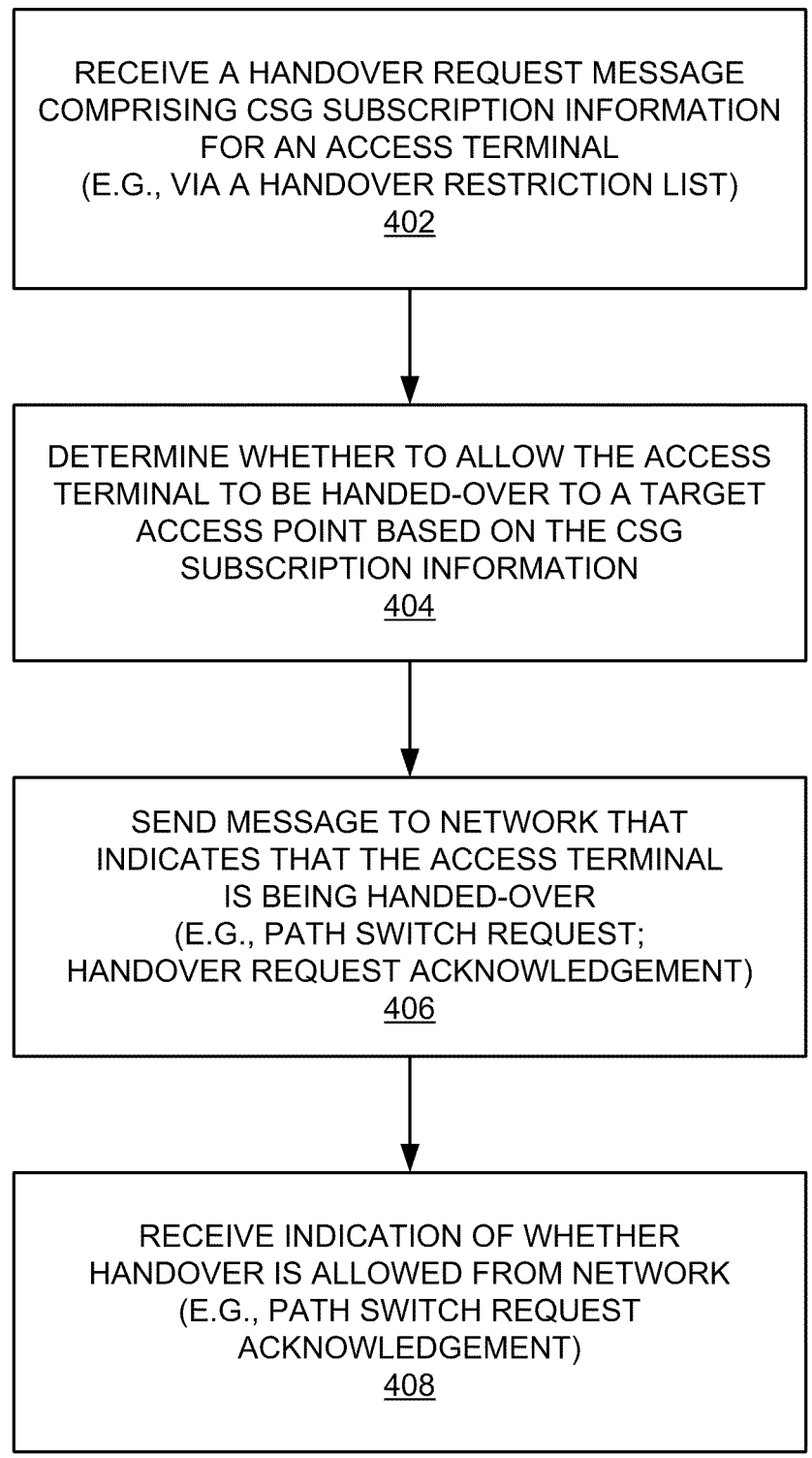
FIG. 4 is a flowchart of several sample aspects of operations that may be performed to control handover at a target access point.

FIG. 4 describes sample operations that may be performed by a target access point to control whether an access terminal will be handed-over to the target access point.

As represented by block 402, the target access point receives a handover request message. As discussed herein, the target access point may receive the handover request message from, for example, the source access point or a network node. In some aspects, the handover request message may comprise CSG subscription information for the access terminal that is being handed-over. For example, the CSG subscription information may be included in a handover restriction list that is included in the handover request message.

As represented by block 404, the target access point determines whether to allow the access terminal to be handed-over based on the CSG subscription information for the access terminal. For example, the target access point may determine whether the CSG subscription information includes a CSG ID associated with the target access point.

If the target access point determines that the handover should not be allowed, the target access point will terminate handover operations and send an appropriate failure message to an appropriate node. Alternatively, if the target access point decides to allow the handover, the target access point may send a handover message to an appropriate node as represented by block 406. This message may explicitly or implicitly indicate that the access terminal is being handed-over to the target access point.

In some aspects, the destination for this handover message may depend on the type of message received at block 402. As described in FIG. 5, in implementations where a handover request message is received from the source access point, the target access point may send a path switch request message to a network node at block 406 to request that the handover be completed. As described in FIG. 6, in implementations where a handover request message was received from a network node, the target access point may send a handover request acknowledge message to the network node at block 406 to request that the handover be completed.

In some aspects, the message sent at block 406 may trigger handover access control at a network node. For example, as discussed above in conjunction with FIG. 3, upon receiving a handover message from a target access point, a network node also may determine whether to allow the handover.

Accordingly, as represented by block 408, the target access point may subsequently receive an indication of whether the handover is allowed from a network node. As discussed herein, this message may take the form of, for example, a path switch request acknowledgement in the example of FIG. 5.

With the above in mind, sample call flows associated with handover access control will now be described in FIGS. 5 and 6. FIG. 5 describes sample call flow in an implementation where a source access point and a target access point are able to directly communicate via, for example, an X2 protocol. FIG. 6 describes sample call flow in an implementation where access points communicate through a network node via, for example, an S1 protocol.

Figure 5:
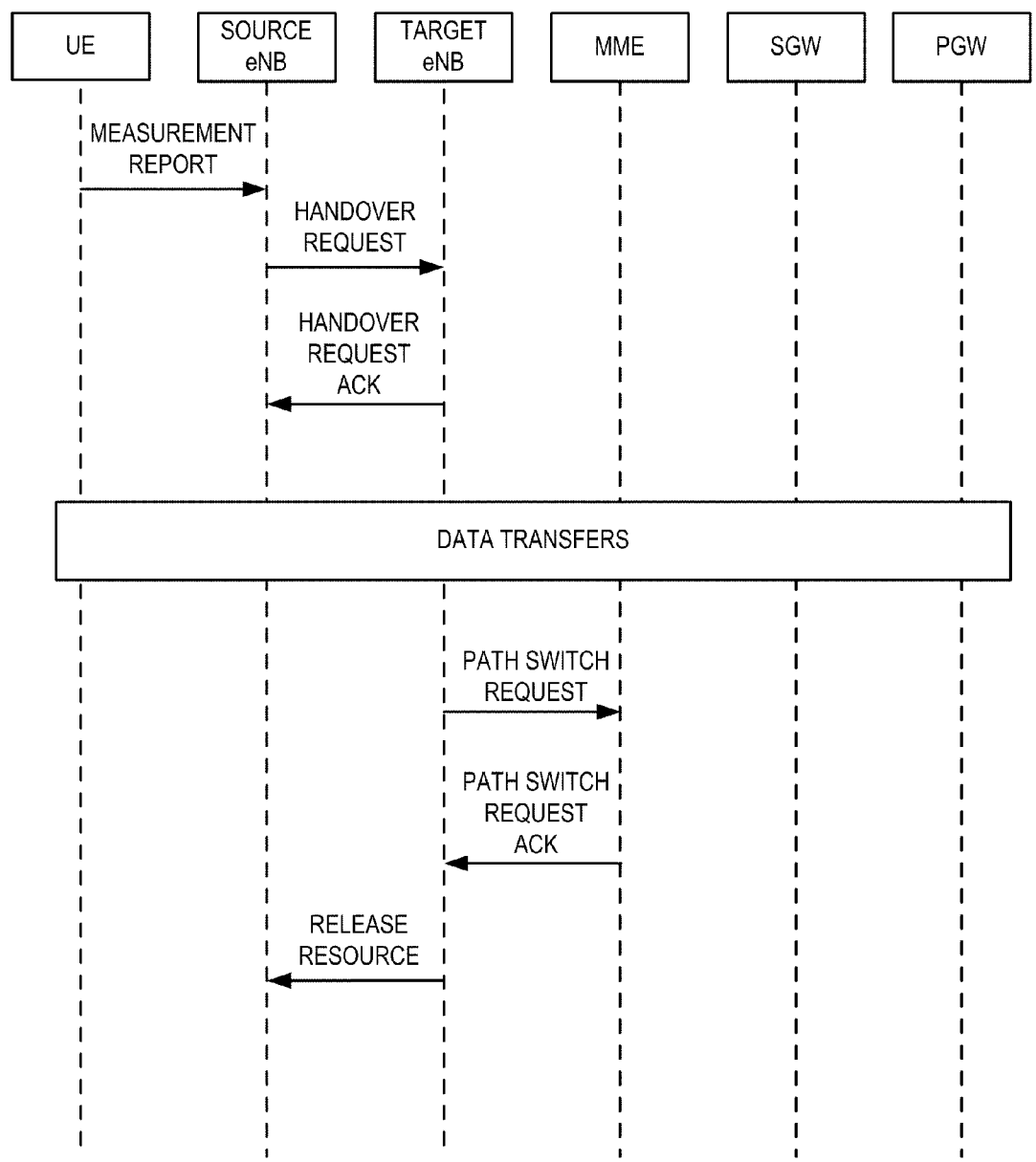
FIG. 5 is a simplified call flow illustrating several sample aspects of operations that may be performed to directly hand-over an access terminal from a source to a target.
Figure 6:
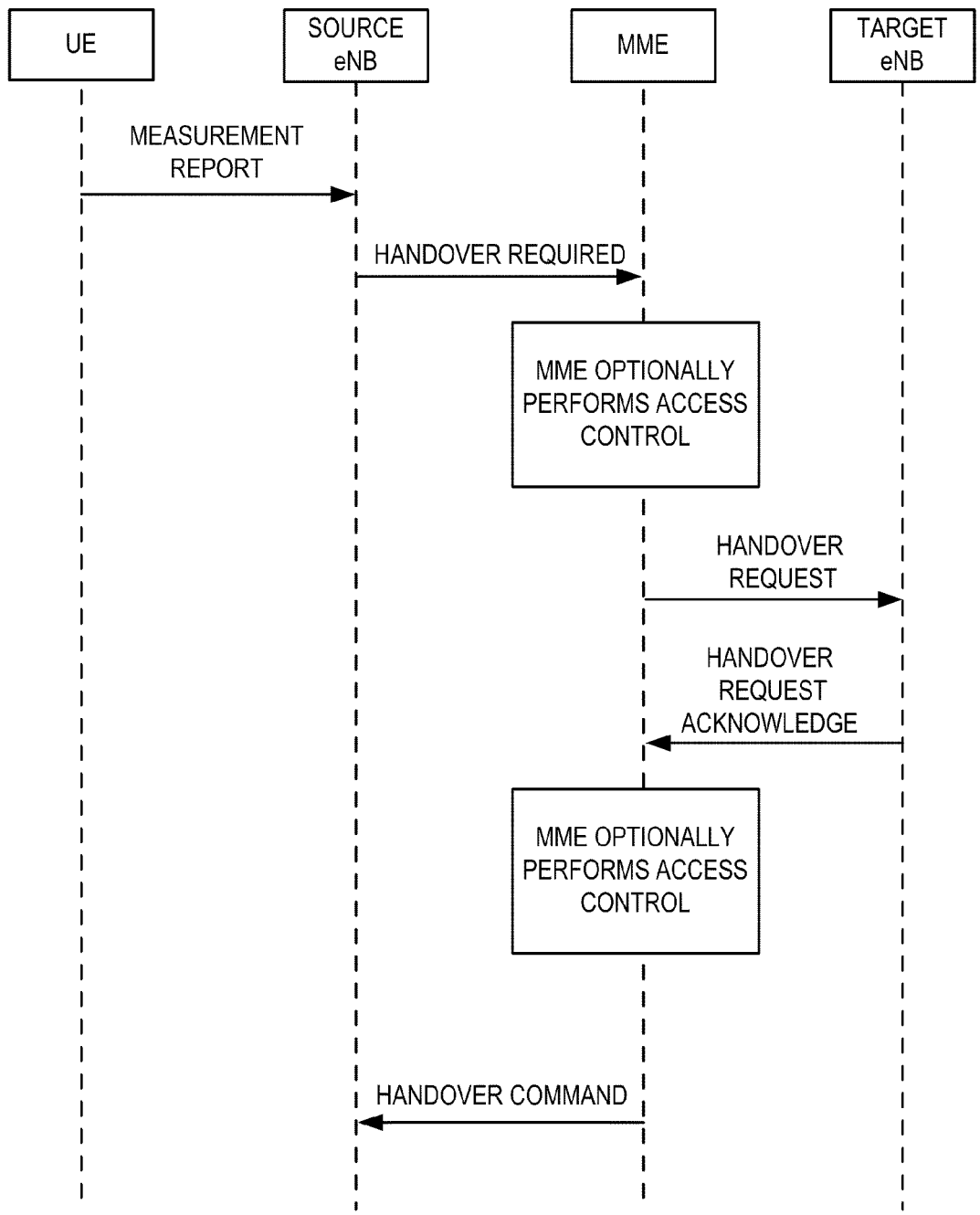
FIG. 6 is a simplified call flow illustrating several sample aspects of operations that may be performed to hand-over an access terminal via a network node.

For purposes of illustration, the examples of FIGS. 5 and 6 describe implementations that are based on LTE. Thus, the figures depict components such as user equipment (UE), an eNodeB (eNB), an MME, a serving gateway (SGW), and a packet data network gateway (PGW). It should be appreciated, however, that the concepts taught herein may be applicable to other implementations (e.g., a UMTS-based system, etc.).

Referring initially to FIG. 5, at some point in time a UE sends a measurement report including a CSG ID of a target CSG cell to its serving eNB (e.g., a home eNB). This triggers a handover preparation message exchange between the source and the target.

Before the source eNB performs a handover to the target CSG cell, the source eNB optionally checks if the CSG ID of the target eNB (e.g., a home eNB) is in the UE's CSG subscription information (e.g., Allowed CSG list). The source eNB includes the Handover Restriction List IE procedures in the Handover Request message sent to the target eNB as part of the X2 handover.

Upon receiving the Handover Request, the target eNB checks if its CSG ID is in the CSG subscription information for the UE (e.g., included in the Handover Restriction List IE). If the UE is allowed to access the CSG cell, the target eNB responds with the Handover Request Acknowledge (Ack).

Handover execution and handover completion operations then commence. In some aspects these operations may include data transfers such as the forwarding of data from the source to the target, the sending of downlink data from the target to the UE, and the sending of uplink data from the UE to the PGW.

The target eNB sends a Path Switch Request message to inform the MME that the UE is changing cells. This message may include the Cell Global Identity of the target cell and the list of rejected EPS bearers. If applicable, the MME then determines that the SGW may continue to serve the UE. The MME may also optionally check if the CSG ID of the target eNB is in the CSG subscription information for the UE upon receiving the Path Switch Request message.

The MME sends a User Plane Update Request (eNB address(es) and TEIDs for downlink user plane for the accepted EPS bearers) message to the SGW. In case any EPS bearers are to be released the MME triggers a bearer release procedure. The SGW starts sending downlink packets to the target eNB using the newly received address and TEIDs. A User Plane Update Response message is sent back to the MME. To assist the reordering function in the target eNB, the SGW shall send one or more "end marker" packets on the old path immediately after switching the path for each SAE bearer of the UE.

The MME confirms the Path Switch Request message with the Path Switch Request Acknowledgement (Ack) message. The MME may provide the eNB with a Handover Restriction List (e.g., as discussed herein).

By sending a Release Resource message, the target eNB informs the source eNB that the handover was successful and triggers the release of resources. Depending on the RAN configuration, the eNB triggers the UE to initiate a Tracking Area Update procedure. RAN functionality provides the ECM CONNECTED UE with the trigger information.

Referring now to FIG. 6, at some point in time a UE sends a measurement report to the source eNB (e.g., a home eNB). As discussed herein, the source eNB may perform handover access control based on CSG subscriber information for the UE. If handover is allowed, the source eNB sends a Handover Required message to the MME (e.g., via S1).

The MME may perform handover access control based on CSG subscriber information for the UE as taught herein. If handover is not allowed, the MME responds to the source eNB with a Handover Preparation Failure message with the appropriate error code (e.g., not authorized for this CSG). If handover is allowed, the MME sends a Handover Request message to the target eNB (e.g., a home eNB).

The target eNB may perform handover access control based on CSG subscriber information for the UE as taught herein. If handover is allowed, the target eNB sends a Handover Request Acknowledge message to the MME.

The MME may perform handover access control upon receipt of the Handover Request Acknowledge message. Again, this access control may be based on CSG subscriber information for the UE as taught herein. The MME may respond to the target eNB with an appropriate message (not shown in FIG. 6) indicative of whether handover is allowed. If handover is allowed, the MME sends a Handover Command message to the source eNB to complete the handover.

Figure 7:
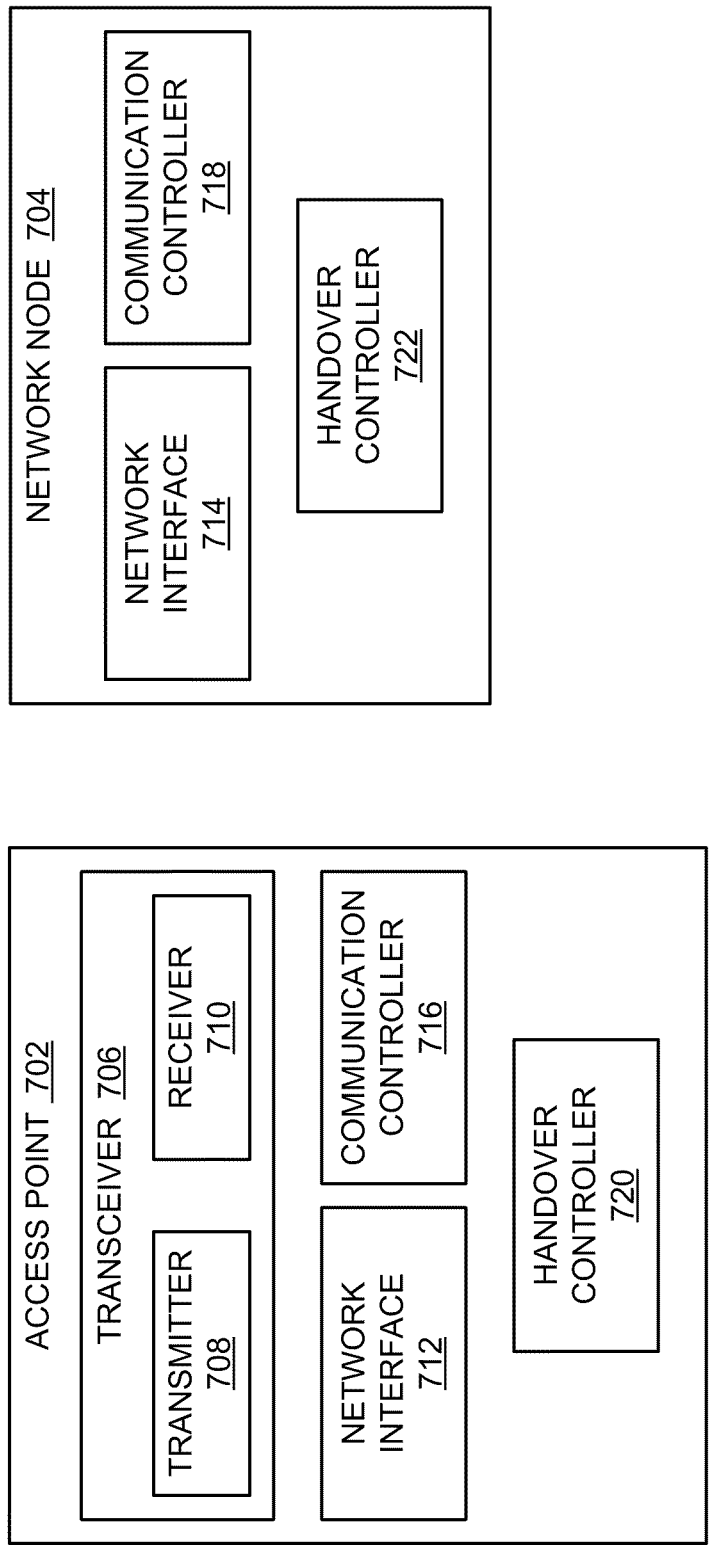
FIG. 7 is a simplified block diagram of several sample aspects of components that may be employed in a communication node.

FIG. 7 illustrates several sample components that may be incorporated into nodes such as an access point 702 (e.g., corresponding to the access point 104 or the access point 106) and a network node 704 (e.g., corresponding to the network node 108) to perform handover operations as taught herein. The described components also may be incorporated into other nodes in a communication system. For example, other nodes in a system may include components similar to those described for the access point 702 and the network node 704 to provide similar functionality. A given node may contain one or more of the described components. For example, an access point may contain multiple transceiver components that enable the access point to operate on multiple frequencies and/or communicate via different technologies.

As shown in FIG. 7, the access point 702 includes a transceiver 706 for communicating with other nodes. The transceiver 706 includes a transmitter 708 for sending signals (e.g., messages) and a receiver 710 for receiving signals (e.g., messages).

The access point 702 and the network node 704 also include network interfaces 712 and 714, respectively, for communicating with one another or other network nodes. For example, the network interfaces 712 and 714 may be configured to communicate with one or more network nodes via a wired or wireless backhaul.

The access point 702 and the network node 704 also include other components that may be used in conjunction with handover operations as taught herein. For example, the access point 702 and the network node 704 may include communication controllers 716 and 718, respectively, for managing communication with other nodes (e.g., sending and receiving handover messages, CSG information, handover indications, and other messages or indications; and establishing connections) and for providing other related functionality as taught herein. In addition, the access point 702 may include a handover controller 720 (e.g., corresponding in some aspects to the functionality of block 110 and/or block 114 of FIG. 1) for managing mobility-related operations (e.g., determining whether to allow handover) and for providing other related functionality as taught herein. Similarly, the network node 704 may include a handover controller 722 (e.g., corresponding in some aspects to the functionality of block 112 of FIG. 1) for managing mobility-related operations (e.g., determining whether to allow handover, comparing CSG information, and sending CSG information) and for providing other related functionality as taught herein.

Also, in some implementations the components of FIG. 7 may be implemented in one or more processors (e.g., that uses and/or incorporates data memory). For example, the functionality of blocks 712, 716, and 720 may be implemented by a processor or processors in an access point, while the functionality of blocks 714, 718, and 722 may be implemented by a processor or processors in a network node.

As discussed above, in some aspects the teachings herein may be employed in an environment that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such an environment, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

A node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., divided into) one or more cells or sectors. A cell or sector associated with a macro access point, a femto access point, or a pico access point may be referred to as a macro cell, a femto cell, or a pico cell, respectively.

Figure 8:
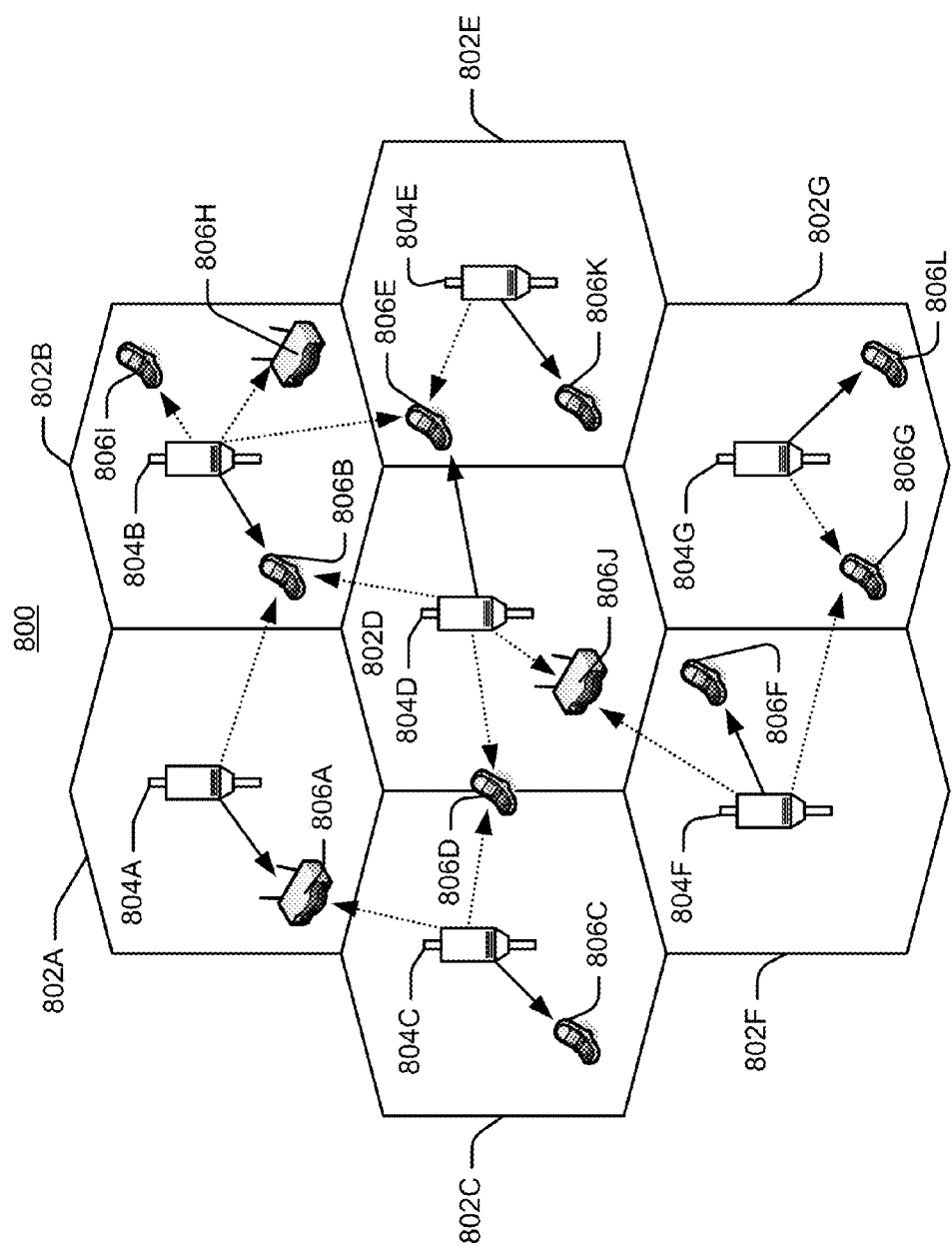
FIG. 8 is a simplified diagram of a wireless communication system.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access point 804 (e.g., access points 804A-804G). As shown in FIG. 8, access terminals 806 (e.g., access terminals 806A-806L) may be dispersed at various locations throughout the system over time. Each access terminal 806 may communicate with one or more access points 804 on a forward link (FL) and/or a reverse link (RL) at a given moment, depending upon whether the access terminal 806 is active and whether it is in soft handoff, for example. The wireless communication system 800 may provide service over a large geographic region. For example, macro cells 802A-802G may cover a few blocks in a neighborhood or several miles in rural environment.

Figure 9:
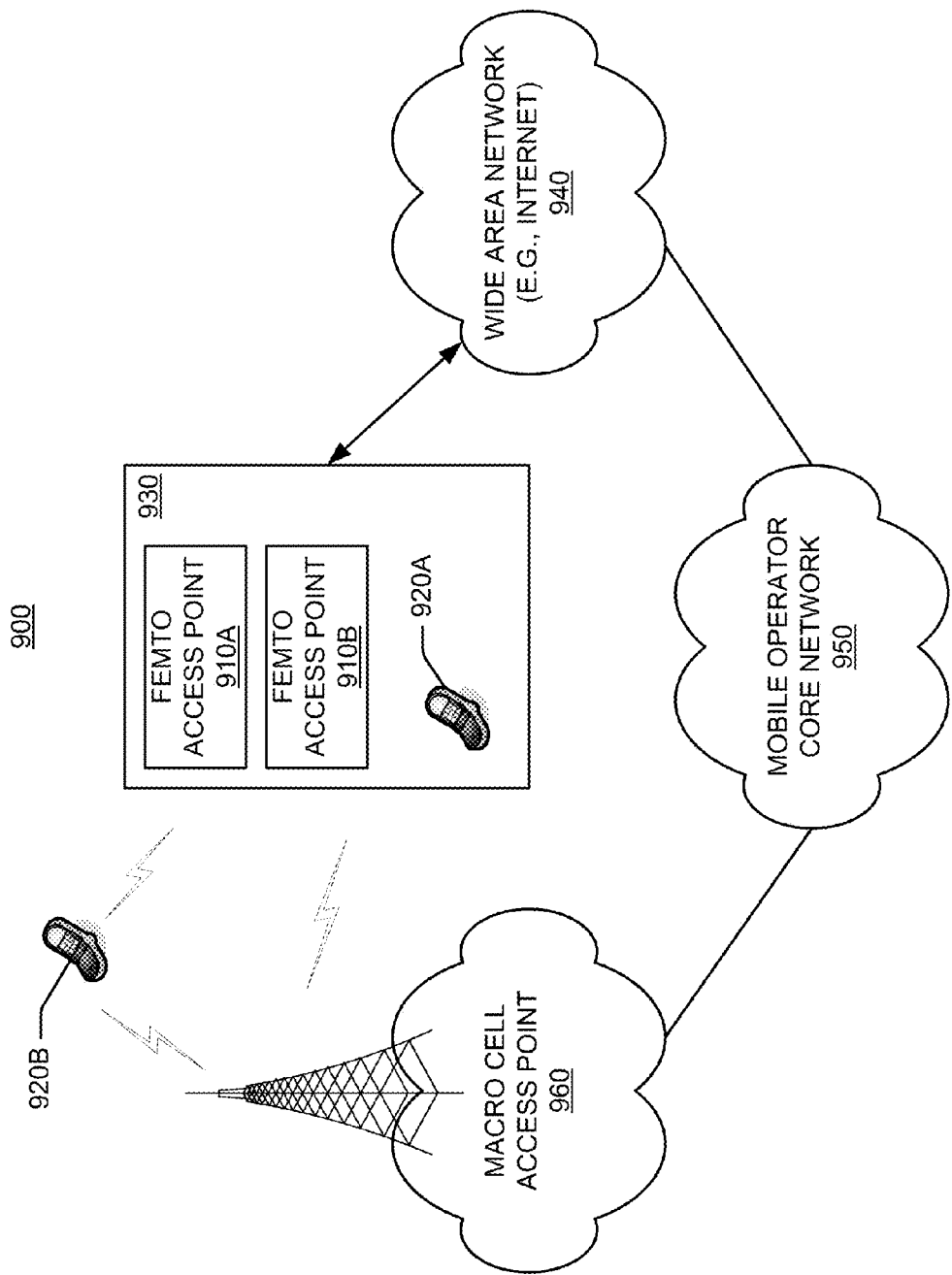
FIG. 9 is a simplified diagram of a wireless communication system including femto nodes.

FIG. 9 illustrates an exemplary communication system 900 where one or more femto access points are deployed within a network environment. Specifically, the system 900 includes multiple femto access points 910 (e.g., femto access points 910A and 910B) installed in a relatively small scale network environment (e.g., in one or more user residences 930). Each femto access point 910 may be coupled to a wide area network 940 (e.g., the Internet) and a mobile operator core network 950 via a DSL router, a cable modem, a wireless link, or other connectivity means (not shown). As will be discussed below, each femto access point 910 may be configured to serve associated access terminals 920 (e.g., access terminal 920A) and, optionally, other (e.g., hybrid or alien) access terminals 920 (e.g., access terminal 920B). In other words, access to femto access points 910 may be restricted whereby a given access terminal 920 may be served by a set of designated (e.g., home) femto access point(s) 910 but may not be served by any non-designated femto access points 910 (e.g., a neighbor's femto access point 910).

Figure 10:
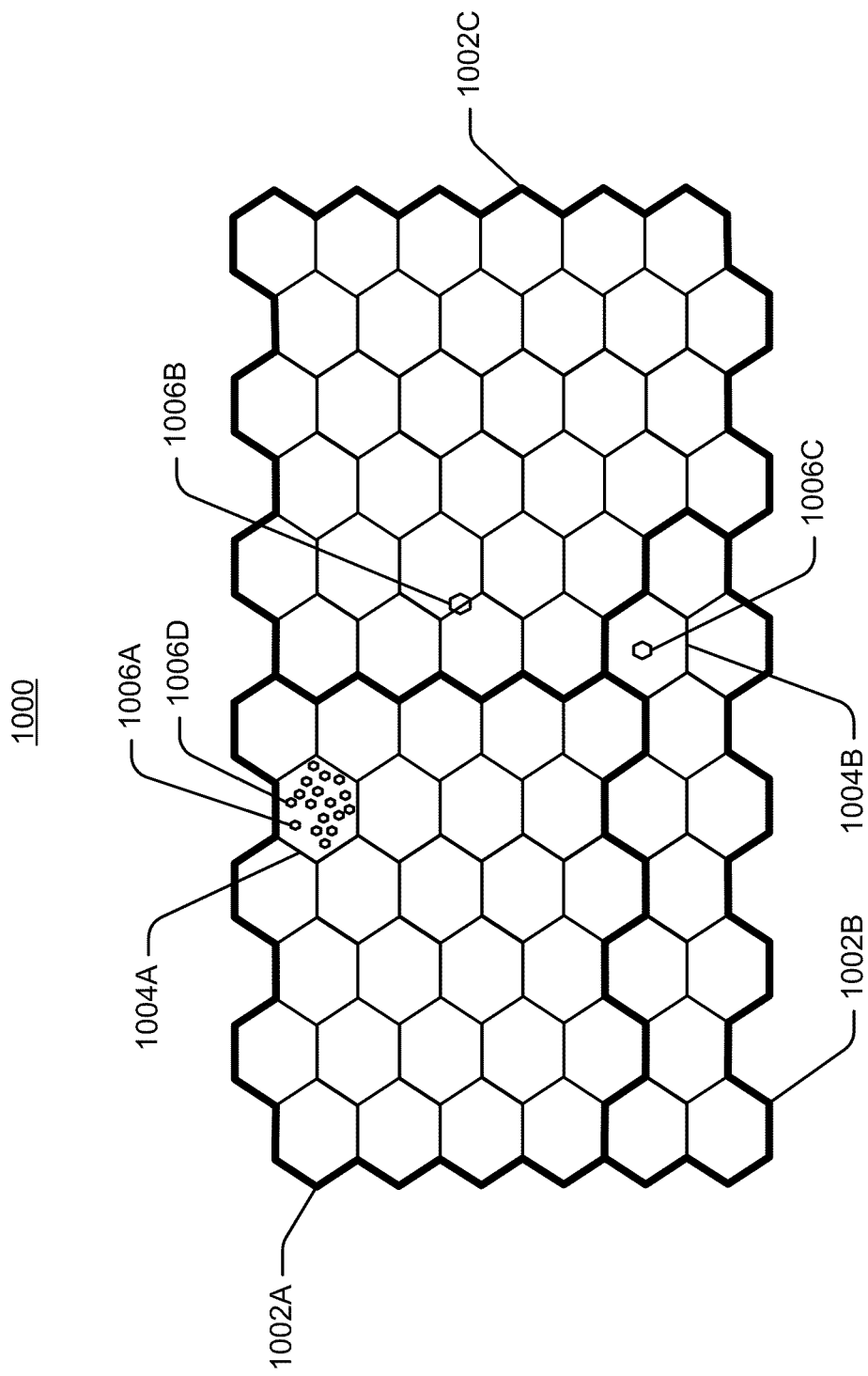
FIG. 10 is a simplified diagram illustrating coverage areas for wireless communication.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the larger hexagons. The tracking areas 1002 also include femto coverage areas 1006. In this example, each of the femto coverage areas 1006 (e.g., femto coverage areas 1006B and 1006C) is depicted within one or more macro coverage areas 1004 (e.g., macro coverage areas 1004A and 1004B). It should be appreciated, however, that some or all of a femto coverage area 1006 may not lie within a macro coverage area 1004. In practice, a large number of femto coverage areas 1006 (e.g., femto coverage areas 1006A and 1006D) may be defined within a given tracking area 1002 or macro coverage area 1004. Also, one or more pico coverage areas (not shown) may be defined within a given tracking area 1002 or macro coverage area 1004.

Referring again to FIG. 9, the owner of a femto access point 910 may subscribe to mobile service, such as, for example, 3G mobile service, offered through the mobile operator core network 950. In addition, an access terminal 920 may be capable of operating both in macro environments and in smaller scale (e.g., residential) network environments. In other words, depending on the current location of the access terminal 920, the access terminal 920 may be served by a macro cell access point 960 associated with the mobile operator core network 950 or by any one of a set of femto access points 910 (e.g., the femto access points 910A and 910B that reside within a corresponding user residence 930). For example, when a subscriber is outside his home, he is served by a standard macro access point (e.g., access point 960) and when the subscriber is at home, he is served by a femto access point (e.g., access point 910A). Here, a femto access point 910 may be backward compatible with legacy access terminals 920.

A femto access point 910 may be deployed on a single frequency or, in the alternative, on multiple frequencies. Depending on the particular configuration, the single frequency or one or more of the multiple frequencies may overlap with one or more frequencies used by a macro access point (e.g., access point 960).

In some aspects, an access terminal 920 may be configured to connect to a preferred femto access point (e.g., the home femto access point of the access terminal 920) whenever such connectivity is possible. For example, whenever the access terminal 920A is within the user's residence 930, it may be desired that the access terminal 920A communicate only with the home femto access point 910A or 910B.

In some aspects, if the access terminal 920 operates within the macro cellular network 950 but is not residing on its most preferred network (e.g., as defined in a preferred roaming list), the access terminal 920 may continue to search for the most preferred network (e.g., the preferred femto access point 910) using a better system reselection (BSR), which may involve a periodic scanning of available systems to determine whether better systems are currently available, and subsequent efforts to associate with such preferred systems. With the acquisition entry, the access terminal 920 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 910, the access terminal 920 selects the femto access point 910 for camping within its coverage area.

A femto access point may be restricted in some aspects. For example, a given femto access point may only provide certain services to certain access terminals. In deployments with so-called restricted (or closed) association, a given access terminal may only be served by the macro cell mobile network and a defined set of femto access points (e.g., the femto access points 910 that reside within the corresponding user residence 930). In some implementations, a node may be restricted to not provide, for at least one node, at least one of: signaling, data access, registration, paging, or service.

In some aspects, a restricted femto access point (which may also be referred to as a closed subscriber group Home NodeB) is one that provides service to a restricted provisioned set of access terminals. This set may be temporarily or permanently extended as necessary. In some aspects, a closed subscriber group identifies subscribers of an operator who are permitted to access one or more cells of a wireless network (e.g., PLMN) but which have restricted access. In some aspects, a closed subscriber group may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with no restricted association (e.g., the femto access point allows access to any access terminal). A restricted femto access point may refer to a femto access point that is restricted in some manner (e.g., restricted for association and/or registration). A home femto access point may refer to a femto access point on which the access terminal is authorized to access and operate on (e.g., permanent access is provided for a defined set of one or more access terminals). A hybrid (or guest) femto access point may refer to a femto access point on which an access terminal is temporarily authorized to access or operate on. An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point (e.g., the access terminal has permanent access to the femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
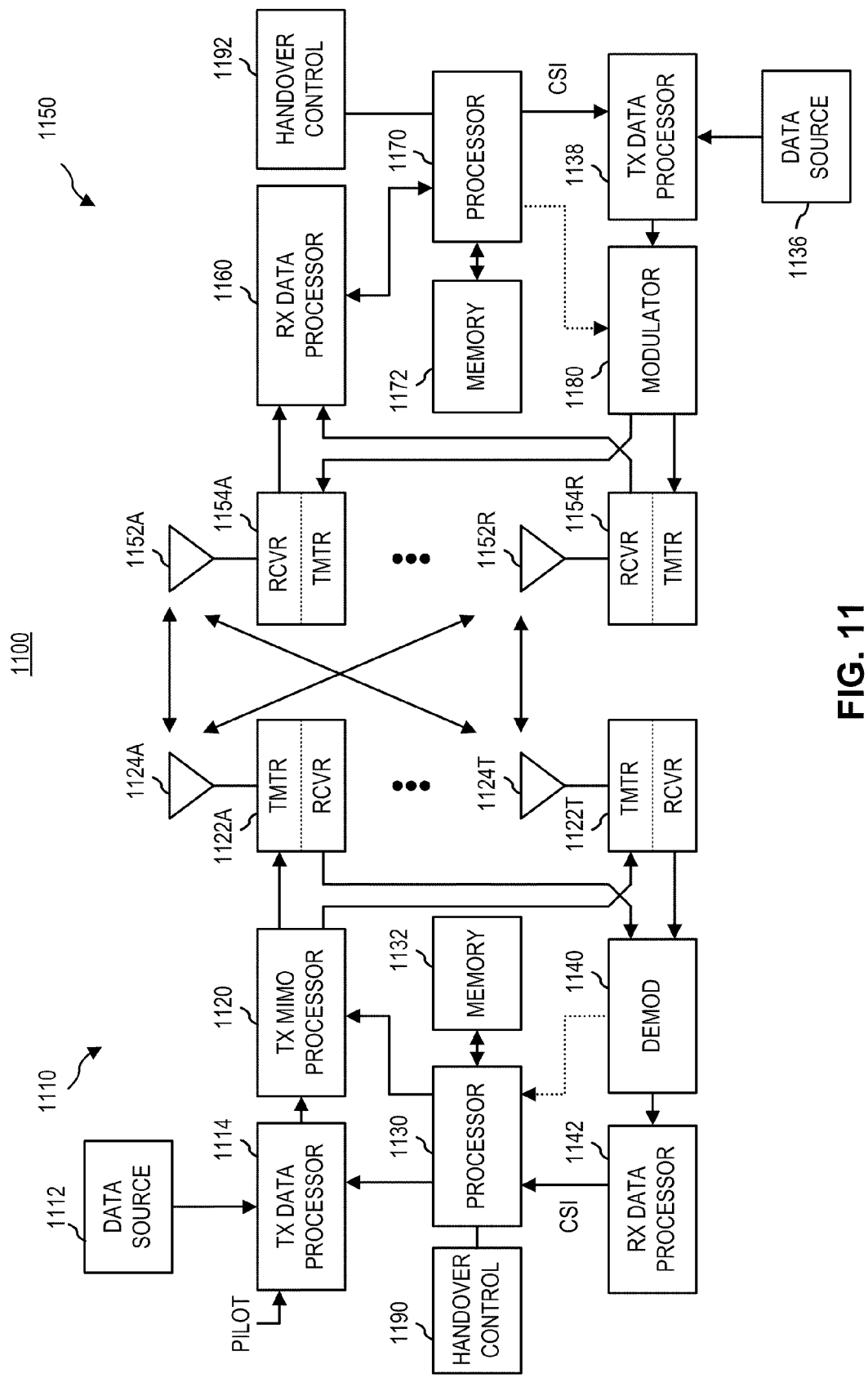
FIG. 11 is a simplified block diagram of several sample aspects of communication components.
Figure 12:
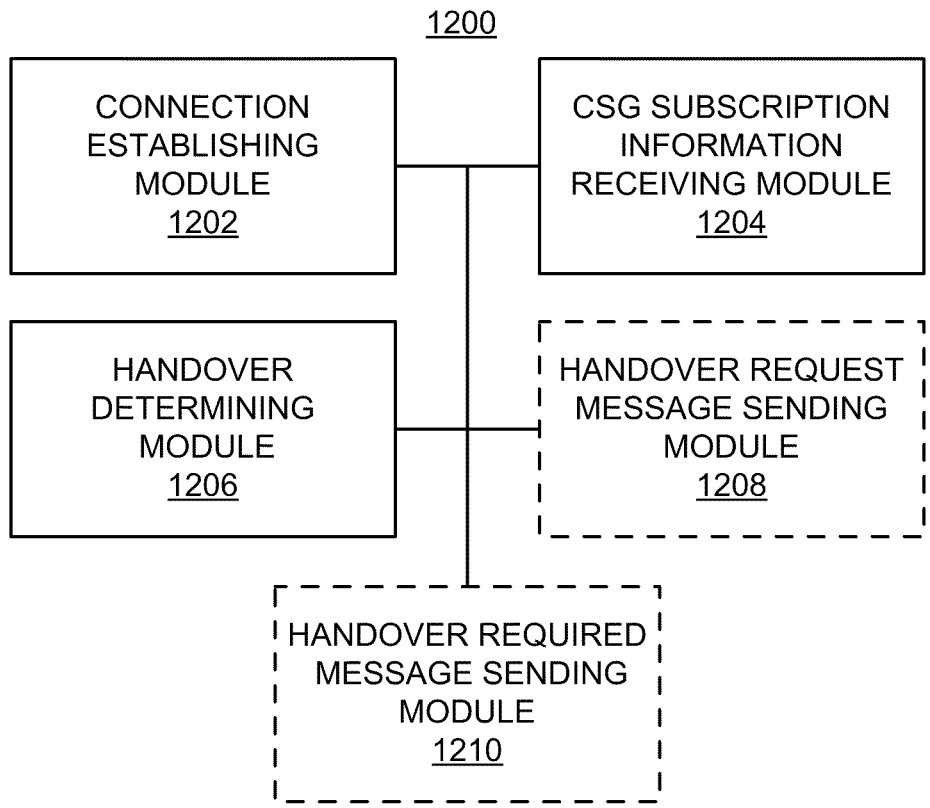
FIGS. 12-15 are simplified block diagrams of several sample aspects of apparatuses configured to provide handover control as taught herein.
Figure 13:
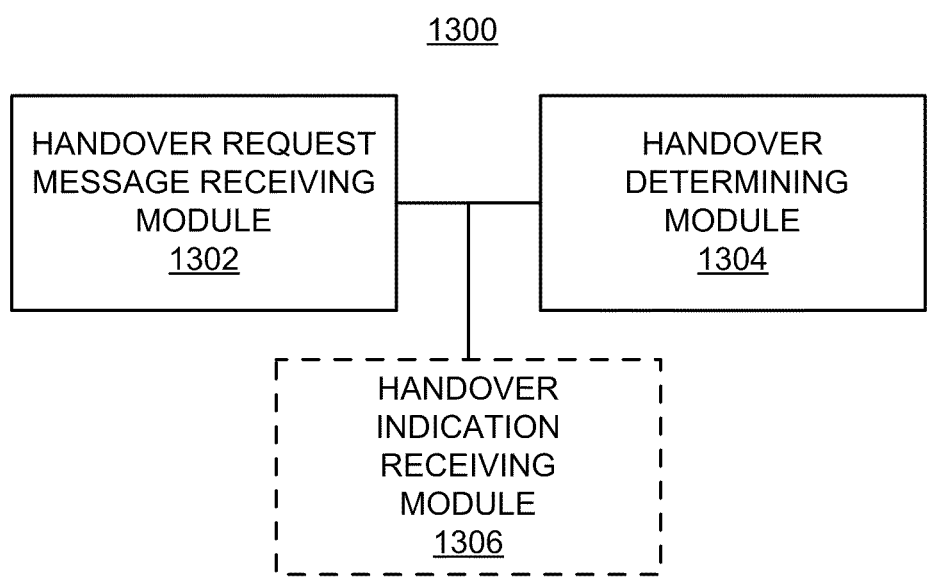
Figure 14:
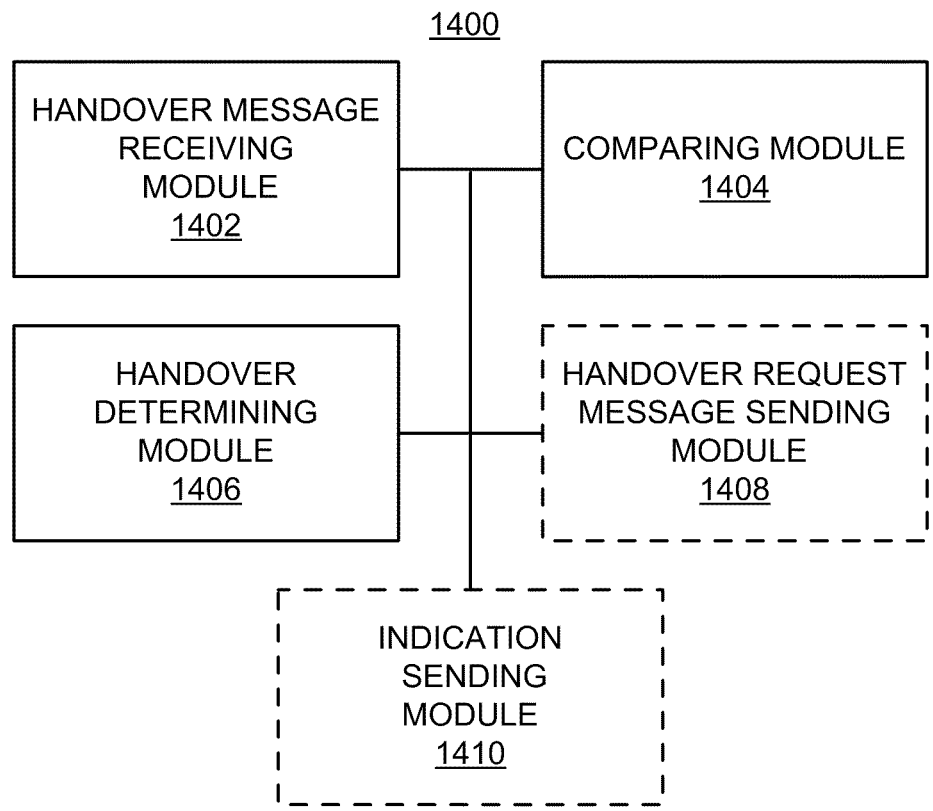
Figure 15:
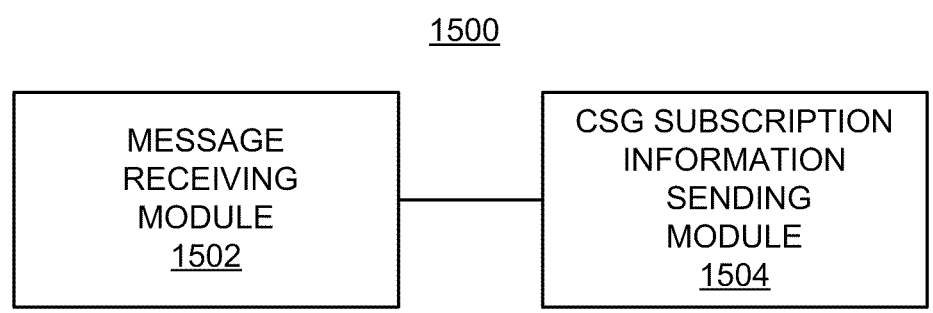

FIG. 11 illustrates a wireless device 1110 (e.g., an access point) and a wireless device 1150 (e.g., an access terminal) of a sample MIMO system 1100. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which precoding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform handover control operations as taught herein. For example, a handover control component 1190 may cooperate with the processor 1130 and/or other components of the device 1110 to send/receive signals to/from another device (e.g., device 1150) as taught herein. Similarly, a handover control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the handover control component 1190 and the processor 1130 and a single processing component may provide the functionality of the handover control component 1192 and the processor 1170.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1×RTT, 1×EV-DO Re1O, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 12, 13, 14, and 15, apparatuses 1200, 1300, 1400, and 1500 are represented as a series of interrelated functional modules. Here, a connection establishing module 1202 may correspond at least in some aspects to, for example, a communication controller as discussed herein. A CSG subscription information receiving module 1204 may correspond at least in some aspects to, for example, a communication controller as discussed herein. A handover determining module 1206 may correspond at least in some aspects to, for example, a handover controller as discussed herein. A handover request message sending module 1208 may correspond at least in some aspects to, for example, a communication controller as discussed herein. A handover required message sending module 1210 may correspond at least in some aspects to, for example, a communication controller as discussed herein. A handover request message receiving module 1302 may correspond at least in some aspects to, for example, a communication controller as discussed herein. A handover determining module 1304 may correspond at least in some aspects to, for example, a handover controller as discussed herein. A handover indication receiving module 1306 may correspond at least in some aspects to, for example, a communication controller as discussed herein. A handover message receiving module 1402 may correspond at least in some aspects to, for example, a communication controller as discussed herein. A comparing module 1404 may correspond at least in some aspects to, for example, a handover controller as discussed herein. A handover determining module 1406 may correspond at least in some aspects to, for example, a handover controller as discussed herein. A handover request message sending module 1408 may correspond at least in some aspects to, for example, a communication controller as discussed herein. An indication sending module 1410 may correspond at least in some aspects to, for example, a communication controller as discussed herein. A message receiving module 1502 may correspond at least in some aspects to, for example, a communication controller as discussed herein. A CSG subscription information sending module 1504 may correspond at least in some aspects to, for example, a handover controller as discussed herein.

The functionality of the modules of FIGS. 12-15 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 12-15 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
    receiving at a network node a message from an access point that indicates that an access terminal is being handed-over to a target access point, wherein the message is a handover required message from a source access point, a handover request acknowledgment message from the target access point or a path switch request message from the target access point;
    providing closed subscriber group subscription information, wherein the closed subscriber group subscription information comprises a list of one or more closed subscriber group identifiers;
    comparing, by the network node, a closed subscriber group identifier of the target access point with the one or more closed subscriber group identifiers in the closed subscriber group subscription information for the access terminal; and
    determining whether to allow the access terminal to be handed-over to the target access point based on the comparison.

2. The method of claim 1, wherein the message is received from the target access point.

3. The method of claim 2, further comprising sending an indication of the determination to the target access point.

4. The method of claim 1, wherein the message is received in response to a handover request message sent to the target access point.

5. The method of claim 1, wherein the determination is made by a mobility manager for handover.

6. The method of claim 1, wherein the target access point comprises a femto access point.

7. The method of claim 1, wherein:
    the target access point comprises a femto access point;
    the network node comprises a mobility management entity;
    the message is the path switch request message from the target access point; and
    the method further comprises sending a user plane update request message to a serving gateway, receiving a user plane update response message, and sending a path switch request acknowledgment message to the target access point.

8. The method of claim 1, wherein:
    the target access point comprises a femto access point;
    the network node comprises a mobility management entity;
    the message is the handover required message from the source access point; and
    the method further comprises sending a handover request message to the target access point if handover is allowed, and sending a handover preparation failure message to the source access point if handover is not allowed.

9. The method of claim 1, wherein:
    the target access point comprises a femto access point;
    the network node comprises a mobility management entity;
    the message is the handover request acknowledgment message from the target access point; and
    the method further comprises sending a handover command message to the source access point if handover is allowed.

10. An apparatus for communication, comprising:
    a communication controller configured to receive at a network node a message from an access point that indicates that an access terminal is being handed-over to a target access point, wherein the message is a handover required message from a source access point, a handover request acknowledgment message from the target access point or a path switch request message from the target access point; and
    a handover controller configured to provide closed subscriber group subscription information, wherein the closed subscriber group subscription information comprises a list of one or more closed subscriber group identifiers, the handover controller being further configured to compare a closed subscriber group identifier of the target access point with the one or more closed subscriber group identifiers in the closed subscriber group subscription information for the access terminal, and further configured to determine whether to allow the access terminal to be handed-over to the target access point based on the comparison.

11. The apparatus of claim 10, wherein the message is received from the target access point.

12. The apparatus of claim 11, wherein the communication controller is further configured to send an indication of the determination to the target access point.

13. An apparatus for communication, comprising:
    means for receiving at a network node a message from an access point that indicates that an access terminal is being handed-over to a target access point, wherein the message is a handover required message from a source access point, a handover request acknowledgment message from the target access point or a path switch request message from the target access point;
    means for providing closed subscriber group subscription information, wherein the closed subscriber group subscription information comprises a list of one or more closed subscriber group identifiers;
    means for comparing a closed subscriber group identifier of the target access point with the one or more closed subscriber group identifiers in the closed subscriber group subscription information for the access terminal; and means for determining whether to allow the access terminal to be handed-over to the target access point based on the comparison.

14. The apparatus of claim 13, wherein the message is received from the target access point.

15. The apparatus of claim 14, further comprising means for sending an indication of the determination to the target access point.

16. A computer-program product, comprising:
a non-transitory computer-readable medium comprising code for causing a computer to:
receive at a network node a message from an access point that indicates that an access terminal is being handed-over to a target access point, wherein the message is a handover required message from a source access point, a handover request acknowledgment message from the target access point or a path switch request message from the target access point;
provide closed subscriber group subscription information, wherein the closed subscriber group subscription information comprises a list of one or more closed subscriber group identifiers;
compare a closed subscriber group identifier of the target access point with the one or more closed subscriber group identifiers in the closed subscriber group subscription information for the access terminal; and
determine whether to allow the access terminal to be handed-over to the target access point based on the comparison.

17. The computer-program product of claim 16, wherein the message is received from the target access point.

18. The computer-program product of claim 17, wherein the computer-readable medium further comprises code for causing the computer to send an indication of the determination to the target access point.

* * * * *